Figure 1:
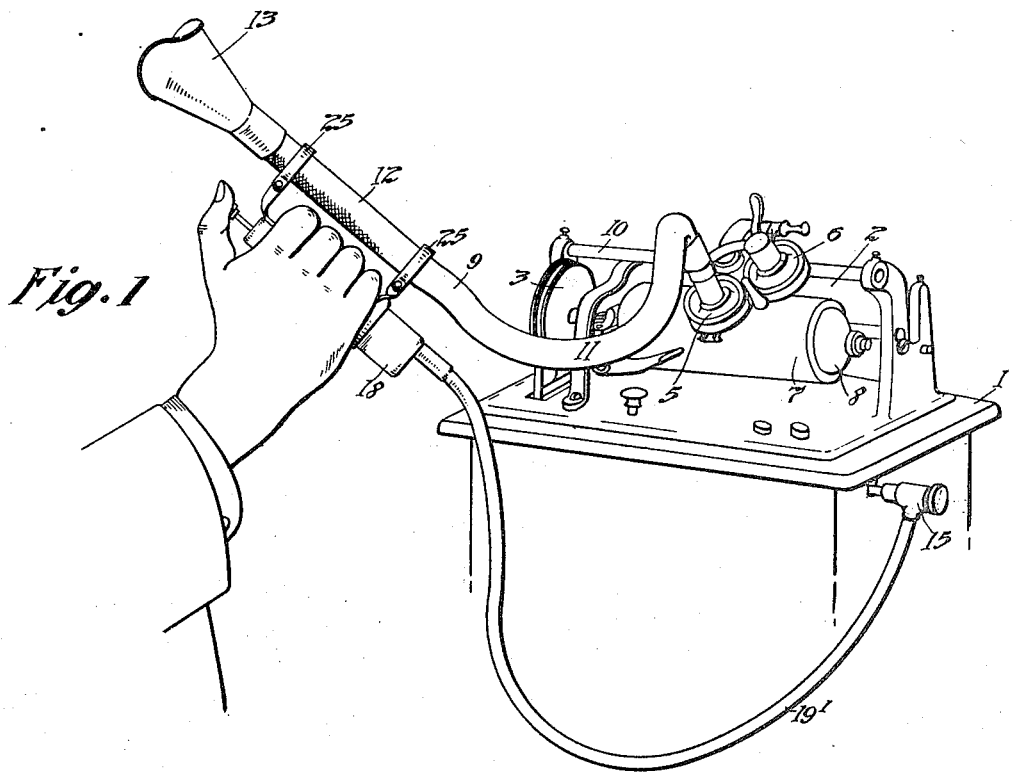

N. C. DURAND.
CONTROLLING DEVICE.
APPLICATION FILED MAY 15, 1912.

1,106,443.

Patented Aug. 11, 1914.

Witnesses:
A. H. Kressler
W. A. Hardy.

Inventor:
Nelson C. Durand,
by Frank L. Dyer
his Atty.

UNITED STATES PATENT OFFICE.

NELSON C. DURAND, OF NEWARK, NEW JERSEY, ASSIGNOR, BY MESNE ASSIGNMENTS, TO NEW JERSEY PATENT COMPANY, OF WEST ORANGE, NEW JERSEY, A CORPORATION OF NEW JERSEY.

CONTROLLING DEVICE.

1,106,443.  Specification of Letters Patent.  Patented Aug. 11, 1914.

Application filed May 15, 1912. Serial No. 697,422.

*To all whom it may concern:*

Be it known that I, NELSON C. DURAND, a citizen of the United States, and a resident of the city of Newark, in the county of Essex and State of New Jersey, have invented certain new and useful Improvements in Controlling Devices, of which the following is a description.

My invention relates to controlling devices and especially to controlling devices for business or other phonographs.

The objects of my invention are to provide improved, simple, and efficient means for controlling the starting and stopping of phonograph or other mechanisms; and to provide controlling devices for a phonograph having means serving as a handle for the sound conveyer thereof, whereby the sound conveyer may be supported in and moved to any desired position, and the controlling device may be actuated, by the hand of the operator.

More specifically described my invention comprises pneumatic means preferably consisting of two pumps connected by flexible tubing, one of the pumps being preferably connected to a clutch between the driving and driven mechanism of a phonograph and the other pump being preferably connected to the sound conveyer of the phonograph and serving as a handle therefor, the sound conveyer being preferably formed with a flexible portion.

Figure 2:
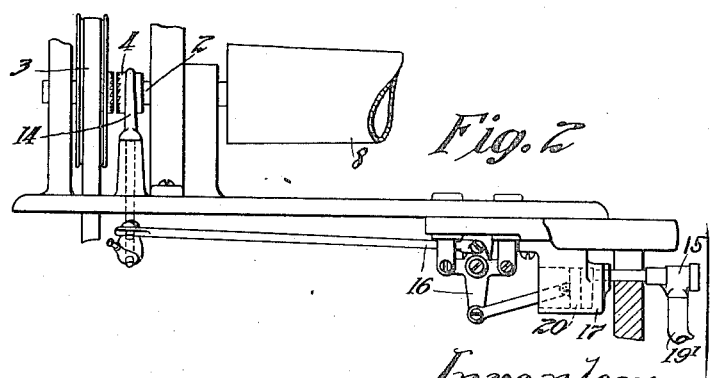

In order that my invention may be more clearly understood, attention is directed to the accompanying drawings, forming a part of this specification in which the same reference characters are used to designate corresponding parts throughout and in which:

Figure 1 is a view in perspective showing a phonograph with my invention applied thereto; Fig. 2 is a front elevation, partly broken away, of the driving and driven mechanism of a phonograph, the clutch between the driving and driven mechanisms, and the means for controlling the clutch; and Fig. 3 is an elevation, partly in section, of the actuating pump of the controlling device which serves as a handle for the sound conveyer.

Referring to the drawings, reference numeral 1 designates a phonograph comprising the phonograph mechanism 2 and the driving mechanism 3. The phonograph mechanism is adapted to be driven by the driving mechanism 3 through a clutch comprising a shiftable clutch member 4. Movement of the clutch member 4 in one direction or the other serves to connect and disconnect the driving and phonograph mechanisms. The phonograph is provided with the usual sound box carrier arm or carriage on which are pivotally mounted the reproducer 5 and recorder 6 forming parts of the phonograph mechanism and either of which is adapted to be brought into operative position with respect to the record blank 7 carried by the mandrel 8.

Reference character 10 represents the usual guide rod for the sound box carrier arm or carriage. One end of a sound conveyer 9 is adapted to be slipped over the neck of either the recorder or reproducer. The sound conveyer preferably comprises an intermediate flexible portion 11 and an outer rigid portion 12 terminating in a bell or mouth piece 13. I provide suitable means for controlling the position of clutch member 4 and thus the stopping and starting of the phonograph mechanism which means preferably comprises a bell crank lever 14 having a loose connection with the clutch member 4, a pneumatic device and suitable connections 16 between the bell crank 14 and the pneumatic device. The pneumatic device preferably consists of a pump 17 mounted on the phonograph frame, a second pump 18, and means connecting the pumps comprising a flexible tube 19' connected at one end with the pump 18 and a detachable connection 15 between the other end of the tube 19' and pump 17. The piston 20 of the pump 17 is connected by the connections 16 to the bell crank lever 14, and this piston is adapted to be moved to actuate the connections 16, bell crank lever 14, and clutch member 4 by the changes in pressure in the column of fluid in the tube 19'.

Figure 3:

Referring to Fig. 3, the pump 18 preferably comprises a hollow member 19 having a preferably enlarged portion forming a cylinder 20' and an elongated portion 21, a spring pressed piston 22 in the cylinder 20', and a rod 23 connected to said piston and extending out through the end of the elongated portion 21, and having a button or thumb-piece 24 on its outer end. The elongated portion 21 of pump 18 is of such a size as to be gripped or held by the hand of the operator while allowing the operator to actuate the rod 23 by his thumb as shown in Fig. 1. The pump 18 is preferably rigidly connected to the rigid portion 12 of the conveyer to serve as a handle therefor by any suitable means, as by brackets 25.

When not in use the sound conveyer and pump 18 will depend from the phonograph, but when it is desired to use the phonograph the operator grasps the handle or elongated portion 21 of pump 18, moves the sound conveyer 9 to the desired position, and presses on the button 24 to start the phonograph mechanism. On applying pressure to the button 24, piston 22 will be forced inwardly against the spring 26 and compress the fluid in tube 19' and thus actuate the piston 20 of the pump 17, connections 16, and bell crank lever 14 to shift the clutch member 4 into a position to operatively connect the driving mechanism 3 and phonograph mechanism 2. Upon release of the pressure on button 24 spring 26 will force the piston 22 to the position shown in Fig. 3, and suction will cause piston 20, connections 16, bell crank lever 14, and clutch member 4 to assume the positions shown in Fig. 2, and disconnect the driving and phonograph mechanisms.

Although I have illustrated my improved controlling device as applied to a phonograph it will of course be understood that it may be adapted for use in numerous other devices.

Having now described my invention, what I claim and desire to protect by Letters Patent is:

1. In a device of the class described, the combination with phonograph mechanism and operating means therefor, of a sound conveyer having a mouth piece and connected to the phonograph mechanism, and a device applied to said sound conveyer and comprising a member constituting a handle, said handle being offset or spaced from the sound conveyer to enable the same to be grasped by the hand and being provided with controlling means for said operating means, substantially as described.

2. In a device of the class described, the combination with phonograph mechanism and operating means therefor, of a sound conveyer having a mouth piece and connected to the phonograph mechanism, and a device applied to said sound conveyer and comprising a member constituting a handle, said handle being offset or spaced from the sound conveyer to enable the same to be grasped by the hand, said member being provided with controlling means for said operating means in a position adapted to be operated by the thumb, substantially as described.

3. In a device of the class described, the combination with phonograph mechanism and operating means therefor, of a sound conveyer having a mouth piece and connected to the phonograph mechanism, and a device applied to said sound conveyer and comprising a member constituting a handle, said handle being offset or spaced from the sound conveyer to enable the same to be grasped by the hand, said member being provided with pneumatic controlling means for said operating means, substantially as described.

4. In a device of the class described, the combination with phonograph mechanism and operating means therefor, of a sound conveyer having a mouth piece and connected to the phonograph mechanism, and a controlling device for said operating means applied to said sound conveyer, said device comprising a tubular member constituting a handle, said handle being offset or spaced from the sound conveyer to enable the same to be grasped by the hand, and a plunger member mounted within said tubular member and extending beyond one end thereof in a position adapted to be operated by the thumb, substantially as described.

This specification signed and witnessed this 10th day of May 1912.

NELSON C. DURAND.

Witnesses:
WILLIAM A. HARDY,
ANNA R. KLEHM.